May 30, 1944.  C. B. SPASE  2,349,996
CLUTCH
Filed May 7, 1942  3 Sheets-Sheet 1

INVENTOR.
Charles B Spase
BY Bodell & Thompson
ATTORNEYS

May 30, 1944.                C. B. SPASE                 2,349,996
                                CLUTCH
                           Filed May 7, 1942           3 Sheets-Sheet 2

INVENTOR.
Charles B Spase
BY Bodell & Thompson
ATTORNEYS

May 30, 1944. C. B. SPASE 2,349,996
CLUTCH
Filed May 7, 1942 3 Sheets-Sheet 3

INVENTOR.
Charles B Spase
BY Bodell & Thompson
ATTORNEYS

Patented May 30, 1944

2,349,996

UNITED STATES PATENT OFFICE 2,349,996

CLUTCH

Charles B. Spase, Nedrow, N. Y., assignor to Lipe-Rollway Corporation, Syracuse, N. Y., a corporation of New York Application May 7, 1942, Serial No. 442,027

7 Claims. (Cl. 192—68)

This invention relates to friction clutches embodying a pressure ring or rings, and has for its object a particularly simple and efficient means for separating the pressure ring from the coacting friction plate or disk when the clutch throwout mechanism is operated to disengage the clutch, said means embodying a spring-pressed part or plunger in which the spring is located outside the driving and driven members of the clutch, so as to be adequately cooled and not subject to the heat generated in the clutch and deterioration thereby.

The invention further has for its object stop means for limiting the movement of the pressure ring in a retrograde direction under the influence of the spring-operated part acting on the pressure ring, when the clutch is being released.

The invention consists in the novel features and in the combinations and constructions hereinafter set forth and claimed.

In describing this invention, reference is had to the accompanying drawings in which like characters designate corresponding parts in all the views.

Figure 1:
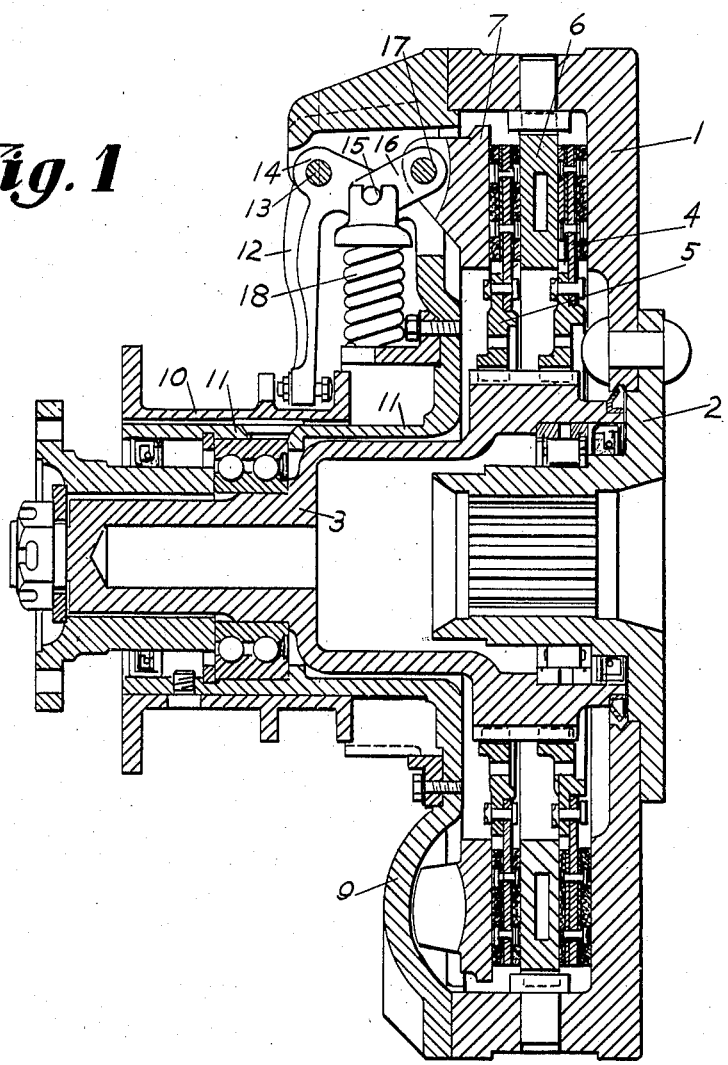
Figure 1 is a longitudinal sectional view, partly in elevation, of a clutch embodying this invention.

The invention, as here illustrated, is shown as embodied in a clutch of the type shown in Patent No. 2,280,357, issued April 21, 1942, and embodying two pressure rings, although it may be embodied in any type of clutch, as a clutch embodying one pressure ring, or its equivalent, where the clutch operating mechanism is not coupled to the pressure ring, as by pivotal joints, but merely thrusts or cams against the same.

In the clutch here illustrated, I designates the driving member, which may be the fly wheel of the engine of the vehicle and includes other parts unitary with the fly wheel, as the back plate 9. The fly wheel is here shown as mounted on an applicator hub 2, which is applied to the crank shaft of the engine of the vehicle. 3 designates the clutch shaft or driven member of the clutch, the driven member also including friction plates or disks 4, 5, shiftable axially of the shaft 3 and slidably splined on the inner end of the shaft 3. 6 and 7 designate pressure rings, which are rotatable with the fly wheel or the driving member 1. They are also shiftable axially and interlocked with the fly wheel or driving member 1 in any suitable manner, or as illustrated in the patent referred to. The pressure ring 6 is interleaved between the friction faces of the plates or disks 4, 5. The pressure ring 7 presses against the rear side of the friction disk or plate 5. The friction disks 4, 5 and the pressure rings 6, 7 are all located in an annular recess 8 in the fly wheel 1, as by screw bolts.

Figure 2:
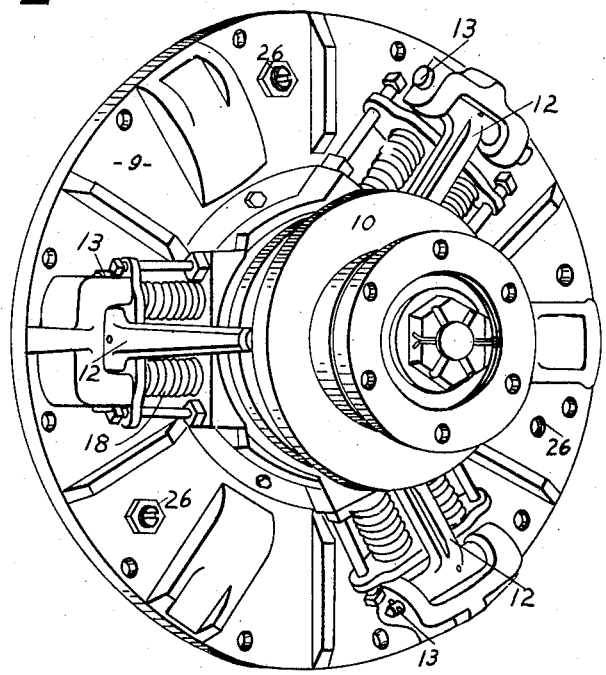
Figure 2 is a rear perspective view of the back plate and mechanism thereon.
Figure 4:
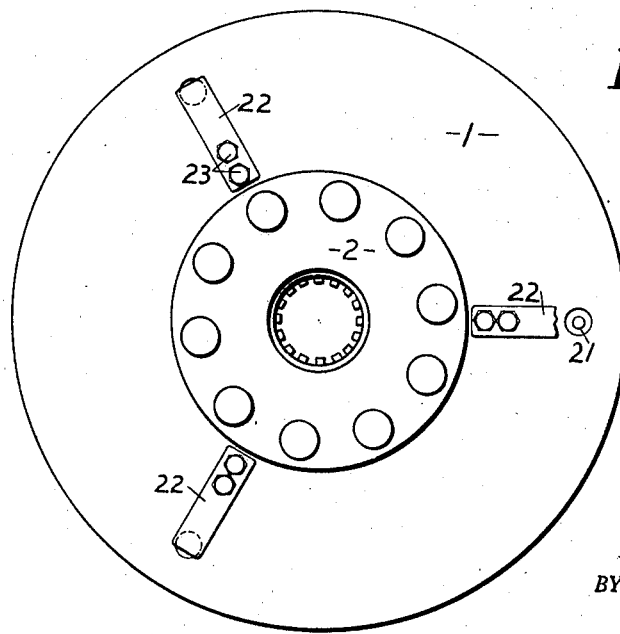
Figure 4 is an elevation of the driving member of the clutch showing the arrangement of the springs for shifting the pressure ring in a retrograde direction, when the clutch is being released.
Figure 3:
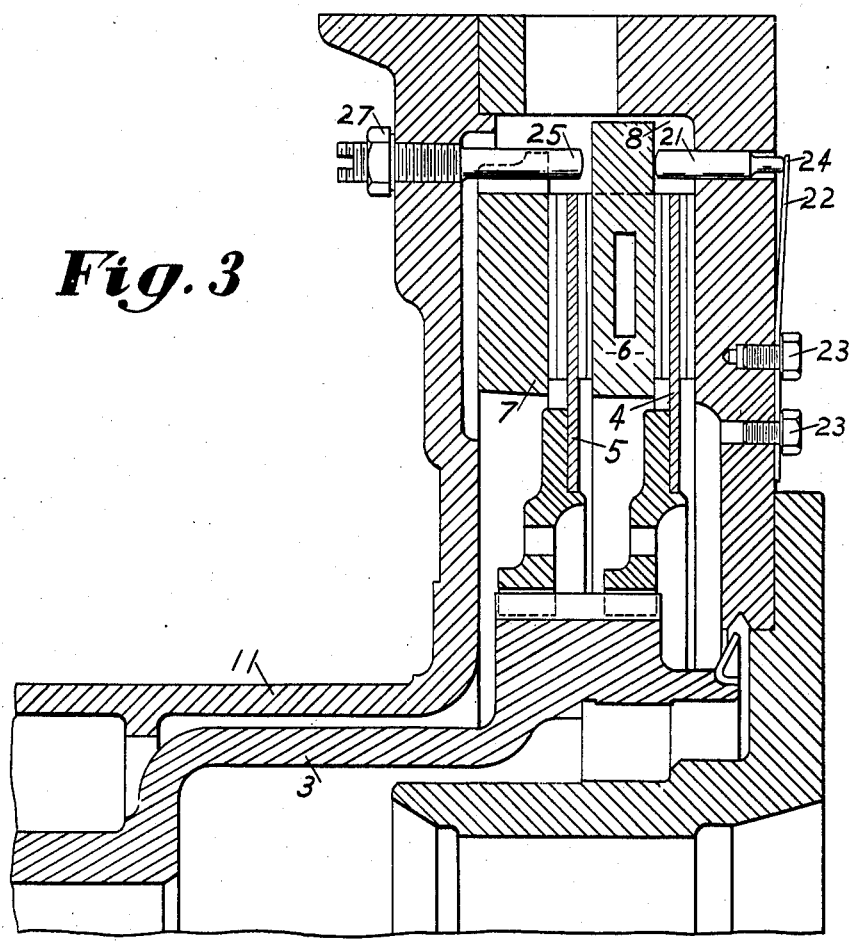
Figure 3 is an enlarged fragmentary detail view of the means for separating the pressure ring from the coacting friction plate, when the clutch is being released, and the stop for limiting the releasing movement of the pressure ring.

The clutch operating mechanism here illustrated is the same as in the patent referred to, it including, generally, a throw-out sleeve or collar 10 slidable on a rearwardly extending hub 11 on the back plate, in which hub the clutch shaft 3 is journalled, radial levers 12 suitably interlocked at their inner ends with the sleeve 10 and pivoted at their outer ends at 13 to the back plate or projections thereon, each lever 12 having an angular arm 14 pivoted at 15 to a link 16, which is pivoted at 17 to the pressure ring 7. The arm 14 and link 16 form a toggle, which is normally folded, and is moved toward straightened position to close or engage the clutch by clutch springs 18, there being a pair of springs 18 for each toggle, as seen in Figure 2.

The construction thus far described is the same as that in the patent referred to.

This invention relates to spring-pressed parts as plungers acting on the pressure ring 6 to quickly separate it from the friction disk 4 when the clutch is being disengaged by movement rearwardly of the throw-out sleeve 10, the rearward movement acting through the levers 12 to fold the toggles, and thus positively shift the rear pressure ring 7 rearwardly away from the friction disk 5, as the toggle is joined or pivoted to the pressure ring 7. In some clutch constructions, the throw-out mechanism may not be pivoted to the pressure ring but merely press against the same, and in such constructions, as where there is only one pressure ring, the release means, which forms the subject matter of this invention, is applicable to a single pressure ring clutch.

The means for separating the pressure ring from the coacting friction disk, when the clutch is being engaged, comprises a spring-pressed part or plunger having its spring located outside the clutch structure or outside the driving member, so as not to be subject to the heat generated in the clutch. In the illustrated embodiment of this invention, the part or plunger extends through the driving member and the bottom of the recess 8 to the front side thereof and in a direction parallel to the axis of the clutch, and is located radially outward far enough to be located beyond the peripheral edge of the friction disk 4, so as to thrust against the pressure ring 6.

21 designates the plunger, and 22 a spring acting to thrust the plunger inwardly, the spring being a flat or leaf spring extending radially relatively to the axis of the clutch and anchored at its inner end to the fly wheel or driving member 1, as by screws 23, and having its outer end pressing at 24 against the outer end of the plunger 21. The springs being leaf or flat, take up no appreciable axial space, are cooled by the air outside the clutch and are not subject to the heat generated within the clutch, although these clutches are provided with air circulating means to cool the interiors thereof. Owing to the use of flat springs, the springs knife through the air and create no appreciable air resistance.

The stop means for limiting the movement of the pressure ring 6 in a retrograde direction, when the clutch is being released, comprises a stop adjustable from the outside of the driving member 1, and preferably comprises stop pins 25 threading through holes 26 in the back plate, the stops being held in their adjusted position by suitable lock nuts 27. There are preferably three plungers 21 and their springs 22 and three stop pins 25 in line with the plungers 21.

In operation, when the clutch is engaged by the clutch springs 18 acting through toggles consisting of the arms 14 of the levers 12 and the links 16, the rear pressure ring 7 compresses against the disk 5, which in turn compresses against the pressure ring 6, this pressing the friction disk 4 against the bottom of the recess 8, and pressure ring 6 presses the plungers 21, and thus load the leaf or flat springs 22. When the clutch is released, as by depressing on the clutch pedal, which draws the throw-out sleeve 10 rearward, the pressure ring 7 is pulled rearward and the springs 22 are now free to shift the plungers 21 inward or rearward and push the pressure ring 6 rearwardly away from the friction disk 4, so that the clutch is released with a minimum of slipping or dragging effect. The stops 25 limit the rearward shifting or release of the pressure ring 6 so as not to apply slipping or dragging pressure to the friction disk 5.

What I claim is:

1. In a friction clutch including driving and driven members, the driving member being formed with an annular recess opening through its rear face, a pressure ring in the recess rotatable with the driving member, the driven member including a friction plate located in the recess and extending between the pressure ring and the driving member, mechanism for applying pressure to and releasing the same from the pressure ring, and a back plate forming a cover for the recess, the mechanism being partly carried by the back plate; the combination of means for shifting the pressure ring in a retrograde direction relatively to the force applied by the clutch engaging and releasing mechanism, for releasing the pressure plate when the clutch mechanism is operated to disengage the clutch, including a spring-pressed plunger slidably mounted in the driving member, extending through the bottom of the recess and thrusting against the pressure ring, and a spring located outside the driving member and thrusting against the plunger.

2. In a friction clutch including driving and driven members, the driving member being formed with an annular recess opening through its rear face, a pressure ring in the recess rotatable with the driving member, the driven member including a friction plate located in the recess and extending between the pressure ring and the driving member, mechanism for applying pressure to and releasing the same from the pressure ring, and a back plate forming a cover for the recess, the mechanism being partly carried by the back plate; the combination of means for shifting the pressure ring in a retrograde direction relatively to the force applied by the clutch engaging and releasing mechanism for releasing the pressure plate when the clutch mechanism is operated to disengage the clutch, including a spring-pressed plunger slidably mounted in the driving member, extending through the bottom of the recess and thrusting against the pressure ring, and a spring located outside the driving member and thrusting against the plunger, the spring being a leaf spring extending radially relatively to the axis of the clutch and secured at its inner end to the driving member and having its free end thrusting against the plunger.

3. In a friction clutch including driving and driven members, the driving member being formed with an annular recess opening through its rear face, a pressure ring in the recess rotatable with the driving member, the driven member including a friction plate located in the recess and extending between the pressure ring and the driving member, mechanism for applying pressure to and releasing the same from the pressure ring, and a back plate forming a cover for the recess, the mechanism being partly carried by the back plate; the combination of means for shifting the pressure ring in a retrograde direction relatively to the force applied by the clutch engaging and releasing mechanism for releasing the pressure plate when the clutch mechanism is operated to disengage the clutch including a spring-pressed plunger slidably mounted in the driving member, extending through the bottom of the recess and thrusting against pressure ring, a spring located outside the driving member and thrusting against the plunger, and a stop extending through the back plate and adjustable from the outside thereof, the stop having its inner end arranged to coact with the pressure ring and limit the releasing movement thereof by the plunger.

4. In a friction clutch including driving and driven members, the driven member including a plurality of friction plates mounted to have relative axial movement, a pressure ring interposed between the friction plates, a second pressure ring coacting with the outermost friction plate, the driving member being formed with a recess in which the friction plates and the pressure rings are located, one of the friction plates thrusting against the bottom of the recess, the pressure rings being interlocked with the driving member to be rotated thereby, and clutch mechanism for applying pressure to and releasing the same from the second pressure ring; the combination of means for moving the first pressure ring in a retrograde direction when the clutch operating mechanism is operated to disengage the clutch, including a plunger thrusting against the first pressure ring in opposition to the clutch operating mechanism when engaging the clutch, the plunger extending through the bottom of the recess, and a spring acting thereon to thrust the plunger inwardly through the bottom of the recess, said plunger thrusting against but being free of the first pressure ring so that it is relieved of transmitting torque to and receiving torque from the first pressure ring.

5. In a friction clutch including driving and driven members, the driven member including a plurality of friction plates mounted to have relative axial movement, a pressure ring interposed between the friction plates, a second pressure ring coacting with the outermost friction plate, and clutch mechanism for applying pressure to and releasing the same from the second pressure ring; the combination of means for moving the first pressure ring in a retrograde direction when the clutch operating mechanism is operated to disengage the clutch, including a plunger slidably mounted in the driving member, extending in a direction parallel to the axis of the clutch and thrusting against the first pressure ring in opposition to the action of the clutch operating mechanism, when engaging the clutch, and a spring mounted on the outside of the driving member and acting on the plunger, the spring being a leaf spring anchored at one end to the driving member on the outside thereof and pressing at its free end against the plunger.

6. In a friction clutch including driving and driven members, the driven member including a plurality of friction plates mounted to have relative axial movement, a pressure ring interposed between the friction plates, a second pressure ring coacting with the outermost friction plate, and clutch mechanism for applying pressure to and releasing the same from the second pressure ring; the combination of means for moving the first pressure ring in a retrograde direction when the clutch operating mechanism is operated to disengage the clutch, including a plunger slidably mounted in the driving member, extending in a direction parallel to the axis of the clutch and thrusting against the first pressure ring in opposition to the action of the clutch operating mechanism, when engaging the clutch, and a spring mounted on the outside of the driving member and acting on the plunger, the spring being a leaf spring anchored at one end to the driving member on the outside thereof, pressing at its free end against the plunger, and extending radially relatively to the axis of the clutch.

7. In a friction clutch including driving and driven members, the driven member including a plurality of friction plates mounted to have relative axial movement, a pressure ring interposed between the friction plates, a second pressure ring coacting with the outermost friction plate, and clutch mechanism for applying pressure to and releasing the same from the second pressure ring; the combination of means for moving the first pressure ring in a retrograde direction when the clutch operating mechanism is operated to disengage the clutch, including a plunger thrusting against the first pressure ring in opposition to the clutch operating mechanism, when engaging the clutch, a spring acting thereon and located outside of the driving member, and a stop carried by the driving member and arranged to limit the retrograde movement of the first pressure ring under the influence of the plunger, the stop extending in a direction parallel to the axis of the clutch to the outside of the driving member and adjustable axially from the outside of the driving member.

CHARLES B. SPASE.